US006393306B1

(12) United States Patent
Hobbi

(10) Patent No.: US 6,393,306 B1
(45) Date of Patent: May 21, 2002

(54) AUTOMATIC CLOCK SETTING

(75) Inventor: Mohd Majed Hobbi, Allentown, PA (US)

(73) Assignee: Agere Systems Guardian Corp., Orlando FL ( * ) Notice: Subject to any disclaimer, the term of this patent is extended or adjusted under 35 U.S.C. 154(b) by 0 days.

(21) Appl. No.: 09/233,580

(22) Filed: Jan. 19, 1999

(51) Int. Cl.[7] .................................................. H04Q 7/20

(52) U.S. Cl. ........................ 455/566; 455/550; 455/414

(58) Field of Search ................................ 368/4, 13, 10, 368/55; 455/550, 556, 566, 414, 415

(56) References Cited

U.S. PATENT DOCUMENTS

| | | | | | |
|---|---|---|---|---|---|
| 5,260,916 | A | | 11/1993 | Schott | 368/47 |
| 5,469,411 | A | | 11/1995 | Owen | 368/47 |
| 5,590,092 | A | | 12/1996 | Fehnel | 368/10 |
| 5,617,146 | A | | 4/1997 | Duffield et al. | 348/460 |
| 5,655,218 | A | * | 8/1997 | Smolinske | 455/566 |
| 5,655,272 | A | | 8/1997 | Smolinske | 455/566 |
| 5,677,895 | A | * | 10/1997 | Mankovitz | 368/10 |
| 5,740,129 | A | * | 4/1998 | Frampton | 368/10 |
| 5,805,530 | A | * | 9/1998 | Youngberg | 368/47 |
| 5,881,023 | A | | 3/1999 | Gu et al. | 368/10 |
| 5,920,824 | A | * | 7/1999 | Beatty et al. | 455/550 |
| 5,995,846 | A | * | 11/1999 | Jakobsen | 455/517 |

FOREIGN PATENT DOCUMENTS

| | | | |
|---|---|---|---|
| EP | 0565180 A2 | 10/1993 | H04Q/7/02 |
| GB | 2312461 A | 11/1997 | G08B/5/22 |
| JP | 58042991 | 12/1983 | G04G/5/00 |

* cited by examiner

*Primary Examiner*—Nay Maung
(74) *Attorney, Agent, or Firm*—John P. Veschi

(57) ABSTRACT

A clocking element that automatically updates when it becomes inaccurate is provided according to the invention. Such a clocking element includes a processor, such as a microprocessor or digital signal processor. It further includes a wireless telephone receiving module that is coupled to the processor. The wireless telephone receiving module is adapted to receive wireless communication signals, such as wireless telephone calls, and to extract temporal information therefrom. Further, the processor is adapted to receive the temporal information from the wireless receiving module and to perform an updating function based thereon. This updating function can be based on a threshold, such that, for example, if the clocking information stored within the device differs from that received by the wireless receiving module by more than a predetermined amount, then the device will update the clocking information to match that provided by the wireless receiving module. In an alternative embodiment according to the invention, a method of maintaining a timing value includes the steps of receiving a communication signal, extracting temporal information from the communication signal, and updating the timing value based on the temporal information. The extracting step can include extracting timing data from a time of day field in the temporal information, and the updating step can include comparing the extracted timing data to the previous timing value and updating the timing value based on the comparison. In one embodiment, the updating step is implemented gradually so that the change in the timing value does not occur abruptly and is, thus, not readily apparent to the user.

23 Claims, 4 Drawing Sheets

AUTOMATIC CLOCK SETTING

FIELD OF THE INVENTION

The invention is directed to the field of clocks, such as digital clocks, and is also directed to the field of electronic devices that incorporate a clocking element.

BACKGROUND OF THE INVENTION

Electronic clocks, such as digital clock radios, are ubiquitous devices that exist in virtually every household and office environment. Further, electronic clocks are incorporated into many products, such as consumer electronics products, including, for example, video cassette recorders (VCRs), microwave ovens, and stereos. Also, many devices maintain a clock for use for other purposes in addition to, or instead of the conventional display purpose. For example, an electronic device can maintain an internal clock for use in operating according to an automated program. An example is a VCR that is programmed to record a specific program at a certain time. Another example is a telephone answering device that maintains a clock to support a feature whereby the telephone answering device announces the time associated with an incoming call when that incoming call is later announced to a user.

In each of the above cases, the functioning of the electronic component is less than optimal if the clock setting is inaccurate. For example, if the announced time associated with an incoming message stored in a telephone answering device is inaccurate, then its value to the user is somewhat diminished since knowledge of the exact or approximate time that the message arrived may be of value in certain situations. Further, if an electronic device, such as a VCR, is programmed to operate during certain hours, and the device instead operates at different hours because an internal clock is inaccurate, the functioning of that electronic device may be less than optimal. For example, an electronic device that automatically turns lights on and off while a homeowner is absent in order to give passers-by the impression that the homeowner is at home, may perform less than optimally if the electronic device turns the lights on only during daylight hours. Finally, it is clearly evident that an electronic clock, such as a clock radio, is not performing optimally if it is displaying an inaccurate time. A minor inaccuracy can cause a minor inconvenience, such as causing a user to be slightly late for an appointment. However, a major inaccuracy can cause even further harm, by, for example, causing a user to wake up late and therefore miss work, school, etc.

There are many ways that the time base for an electronic clock can become inaccurate. For example, daylight savings time causes the time to change in the spring and fall each year. If not adjusted by the user, the time will be incorrect for much of the year. For example, if a telephone answering machine is not adjusted by the user, the time announced in association with a stored incoming message is, in fact, off by an hour during an appreciable portion of the year. If the user elects not to update the time, the user must remember that the time is off by an hour, and must also recall in which direction the time is off, such that the user knows whether to add an hour or to subtract an hour from the announced time. This can clearly be an inconvenient hassle.

Another way in which the time stored by an electronic clock can become inaccurate is when there is a power interruption, such as during a thunder storm, at which time all or most of the clocks within a household may be reset to twelve o'clock. As with the daylight savings time example, when this occurs, the user must reprogram all of the affected clocks within the household if the user desires the clocks to be accurate.

There is a need, therefore, for a clocking element that updates automatically when the clocking element becomes inaccurate.

SUMMARY OF THE INVENTION

A clocking element that automatically updates when it becomes inaccurate is provided according to the invention. Such a clocking element includes a processor, such as a microprocessor or digital signal processor. It further includes a wireless telephone receiving module that is coupled to the processor. The wireless telephone receiving module is adapted to receive wireless communication signals, such as wireless telephone calls, and to extract temporal information therefrom. Further, the processor is adapted to receive the temporal information from the wireless receiving module and to perform an updating function based thereon. This updating function can be based on a threshold, such that, for example, if the clocking information stored within the device differs from that received by the wireless receiving module by more than a predetermined amount, then the device will update the clocking information to match that provided by the wireless receiving module.

In an alternative embodiment according to the invention, a method of maintaining a timing value includes the steps of receiving a communication signal, extracting temporal information from the communication signal, and updating the timing value based on the temporal information. The extracting step can include extracting timing data from a time of day field in the temporal information, and the updating step can include comparing the extracted timing data to the previous timing value and updating the timing value based on the comparison. In one embodiment, the updating step is implemented gradually so that the change in the timing value does not occur abruptly and is, thus, not readily apparent to the user.

BRIEF DESCRIPTION OF THE DRAWINGS

These and other objects and advantages of the invention will be apparent to one of ordinary skill in the art upon review of the following detailed description in light of the drawings, wherein.

DETAILED DESCRIPTION

Figure 1:
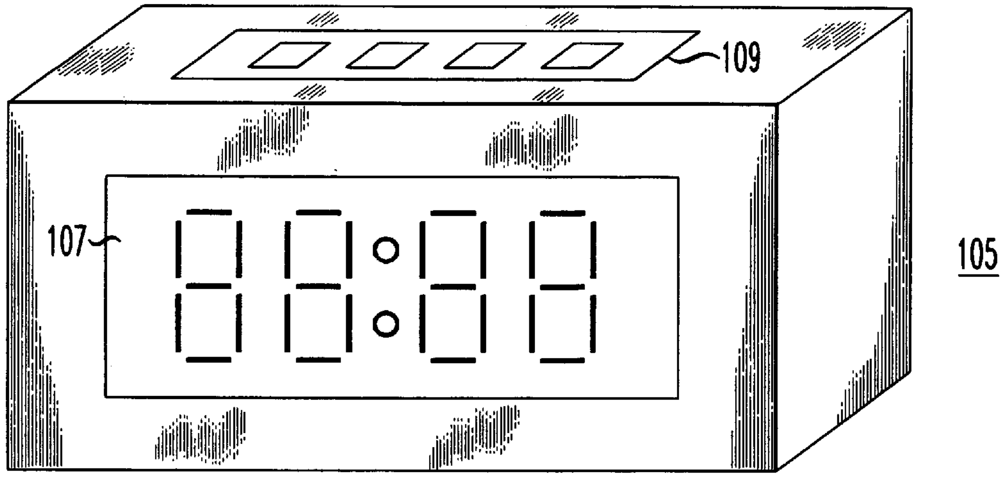
FIG. 1 shows an electronic clock.

FIG. 1 shows a digital clock 105, including a display 107 comprising, for example, a plurality of seven segment display elements, and an input panel 109 including, for example, a plurality of buttons used by a user to program the digital clock.

Figure 2:
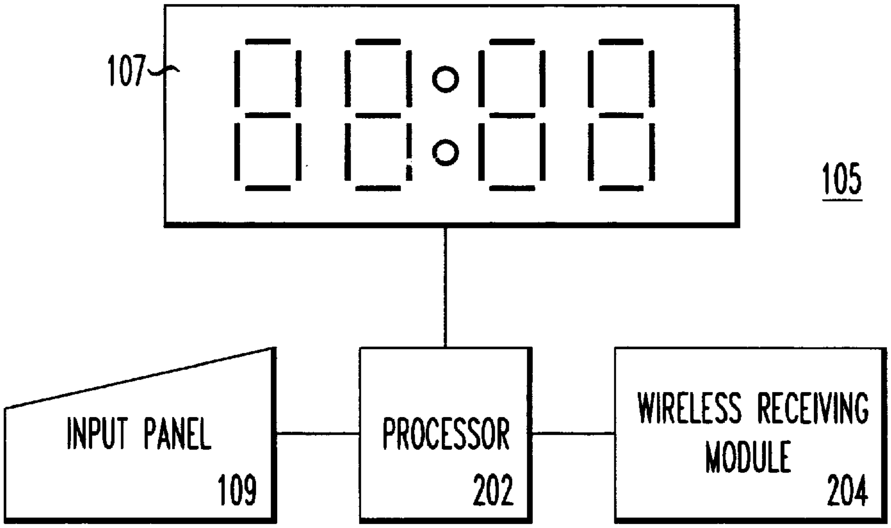
FIG. 2 provides a simplified block diagram of the electronic clock of FIG. 1 according to the invention.

Clock 105 also includes a processor, such as processor 202 shown in the simplified block diagram of FIG. 2.

Processor 202 may be, for example, an integrated circuit microprocessor, such as a digital signal processor (DSP). Alternatively, processor 202 may be an integrated circuit controller, such as a micro-controller or any other type of integrated circuit processor. According to the invention, clock 105 further includes a wireless-receiving module 204 that is coupled to processor 202. The wireless receiving module 204 has the ability to receive wireless communication signals, such as radio frequency (RF) signals transmitted between a base unit and a handset of a cordless telephone, such as a 900 megahertz digital cordless telephone. Further, wireless receiving module 204 is able to extract temporal information from the wireless communication signals and supply this temporal information to processor 202. Processor 202, based on this temporal information, is adapted to update the display 107.

As is known to one of skill in the art of wireless communications, the wireless receiving module 204 preferably incorporates a CODEC for analog-to-digital or digital-to analog conversions, an RF transceiver for operation in the IF band, a transmit/receive module for modulating and/or demodulating, filters, such as low-pass and band-pass filters, and an antenna element. The particular structure of these elements is a matter of design choice, and is not material to an understanding of the present invention.

The wireless receiving module 204, in one embodiment, is configured to receive at least a portion of a caller ID data stream that is incorporated into an RF transmission from a base unit to a handset of a digital cordless telephone. Such a caller ID transmission includes a time and date field, at least a portion of which is stripped off by the wireless receiving module 204 and provided to processor 202.

Processor 202 compares timing data included in the time of day field to a currently displayed time shown on display 107, and takes an action based on a difference between the timing data and the currently displayed time. For example, in one embodiment, processor 202 updates display 107 to reflect the timing data included in the time of day field. This updating action can be based, for example, on the difference between the timing data and the currently displayed time exceeding a predetermined threshold. Thus, for example, if the currently displayed time is off by more than five minutes from the timing data, the currently displayed time will be updated to reflect the timing data. This update may be automatic, or in some embodiments may occur only upon approval, such as from a user. In these embodiments, clock 105 can inform the user, such as by flashing an LED, that an updated time is available, and then can update the time when informed to do so by the user, such as by the user pressing a button on input panel 109 to provide a signal to processor 202.

Instead of simply lighting an LED, display 107 may include information regarding at least one of the timing data, the currently displayed time, and the difference therebetween, such that the user can inform the processor 202 via the input panel, for example, whether the user wants the currently displayed time to be updated.

Instead of displaying the timing data, currently displayed time, and/or the difference therebetween, the processor 202 may cause a signal to be transmitted, such as by way of a transmitter associated with the wireless receiving module 204 within a transceiver, to either an automated system or to a user, and can await a received signal received by the wireless receiving module 204 to inform the processor of the preference as to whether an update should occur.

The aforementioned description of clock 105 is for an exemplary embodiment wherein the objective of processor 202 is to control display 107. Alternatively, the inventive aspects of coupling wireless receiving module 204 to processor 202 may be incorporated into a non-display device that uses clock information for another purpose. For example, processor 202 and wireless receiving module 204 may be incorporated into a telephone answering device and used to periodically update an internal clock of the telephone answering device to maintain clock accuracy with respect to the playback of previously recorded incoming messages. In another example, processor 202 and wireless receiving module 204 may be incorporated into a television that provides a display of the current time whenever a user changes a channel or presses a specific button, such as a time button, on an associated remote control unit. In yet another example, processor 202 and wireless receiving module 204 may be incorporated into a VCR that is capable of being programmed to record a particular television show at a certain time. These are but a few examples of many situations wherein an accurate clock will be advantageous.

In any of the aforementioned embodiments, the advantage of the present invention is that the transmission of a wireless communication signal within range of the wireless receiving module 204 will initiate a process by which the clocking information may be updated. Such a transmission may occur, for example, when a handset of a digital cordless telephone that includes caller ID capability is located distant from its corresponding base unit at the time an incoming call is received. When this occurs, the base unit of the cordless telephone will transmit temporal information, including time of day information, to the handset of the digital cordless telephone over an RF link therebetween. A device, according to the invention, takes advantage of this transmission to perform a clock updating procedure.

The invention is described herein as taking advantage of the time of day information included within the digital cordless telephone RF transmission signal. It is also within the scope of the invention to take advantage of date information that may also be included in the digital cordless telephone RF transmission signal to update a calendar date that may be used by an electronic device or an electronic clock. Further, although the invention is herein described as taking advantage of the digital cordless telephone RF signal, it is equally applicable to take advantage of other RF communication signals that include time of day, date, or other relevant data. For example, some cellular telephone signals include date and time of day information which may be received by wireless receiving module 204 and fed to processor 202 for use in updating display 107.

Figure 3:
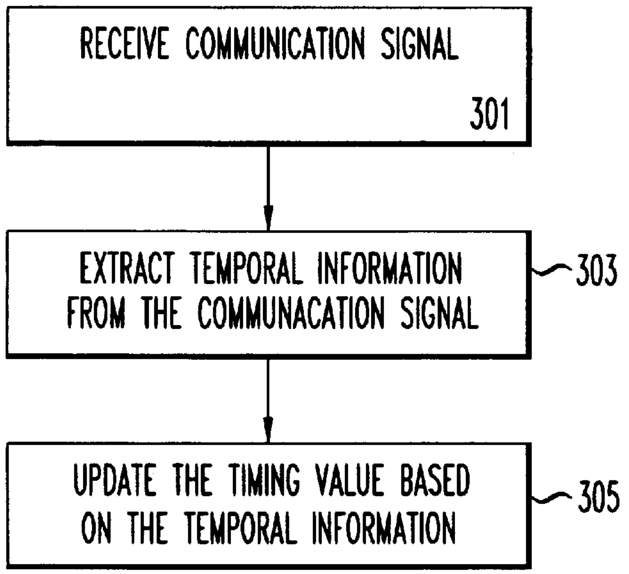
FIG. 3 is an exemplary method of operation of an electronic clock according to the invention.

FIG. 3 shows a process employed by the elements of clock 105 according to the invention. In step 301, a wireless communication signal is received by a wireless receiving module 204. In step 303, the wireless receiving module 204 extracts temporal information from the wireless communication signal. In step 305, the processor 202 updates the timing value based on the temporal information extracted in step 303.

Figure 4:
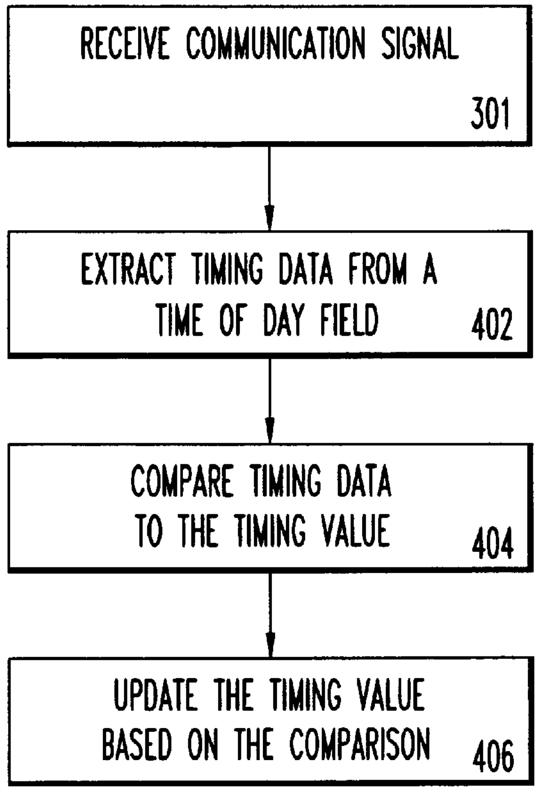
FIG. 4 is an alternative method of operation of an electronic clock according to the invention.

FIG. 4 shows an alternative method according to the invention, wherein the temporal information extracted includes timing data from a time of day field at step 402. Further, at step 404, the processor 202 compares the extracted timing data to the timing value and at step 406, the processor updates the timing value based on the comparison of step 404.

Figure 5:
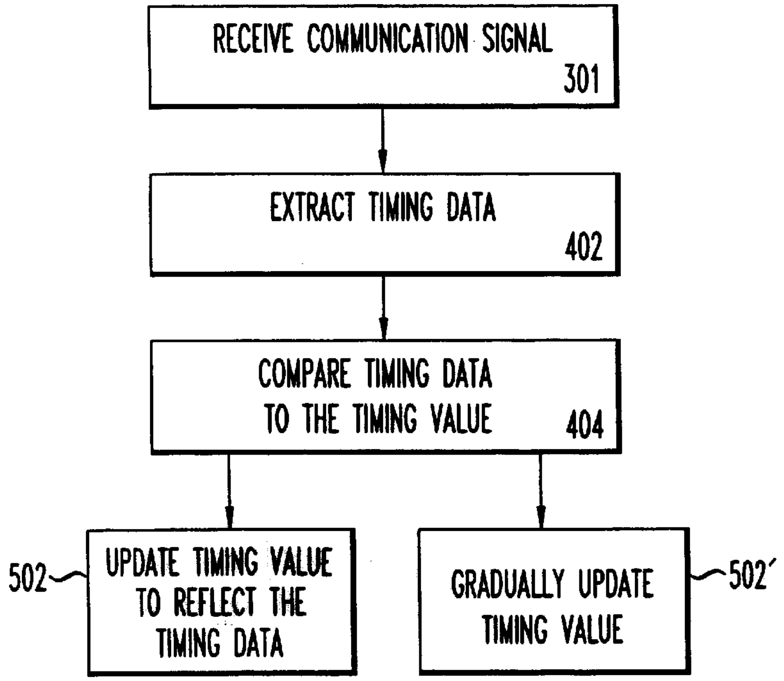
FIG. 5 is another alternative method of operation of an electronic clock according to the invention.

In yet another alternative embodiment, FIG. 5 shows a method wherein the processor updates, at step 502, the timing value to reflect the timing data. Alternatively, as shown at step 502', the processor can gradually update the timing value. For example, presume the timing data from the time of day field shows that the actual time is 2:35, while the timing value is 2:40. Instead of immediately changing the timing value from 2:35 to 2:40, the processor 202 may add a periodic increment to the timing value in addition to the normal clocking increment provided, for example, from a local clock, such as a local oscillator. Thus, instead of abruptly changing the time from 2:35 to 2:40, the processor may cause the time to increase by a few seconds each minute such that the timing value catches up to the appropriate time within an hour or two. This gradual updating process may be advantageous in that it prevents a user from seeing an abrupt change on display 107. Further, it may be advantageous in non-display situations wherein an electronic device is receiving the timing value and may react inappropriately to an abrupt change to the timing value.

Figure 6:
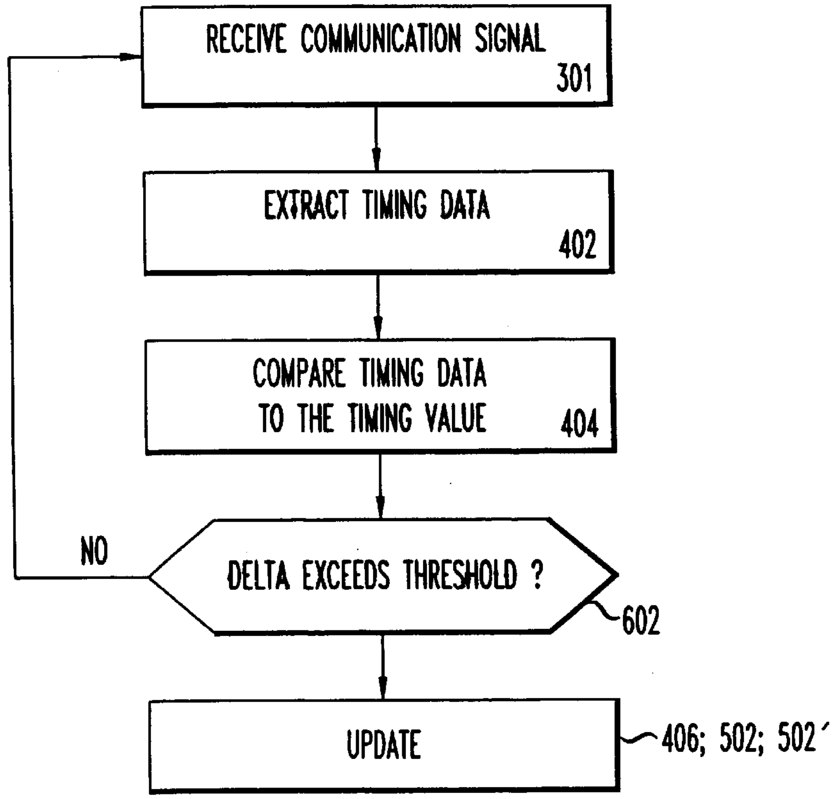
FIG. 6 is yet another method of operation of an electronic clock according to the invention.

FIG. 6 shows an alternative embodiment wherein, after the comparison step 404, it is determined at step 602 whether the delta between the timing data and the timing value exceeds a predetermined threshold. If the predetermined threshold is not exceeded, such that the difference between the timing data and the timing value is deemed to be too small to be concerned about making a change, then the process returns to step 301 to begin again upon the next receipt of a communication signal. Alternatively, if the decision in step 602 is that the delta does exceed the threshold, then the process proceeds to an updating step, such as updating step 406 as shown in FIG. 4, or updating steps 502 or 502' shown in FIG. 5. An example of a threshold used in step 602 may be two minutes. Thus, according to this example, if the timing value is within two minutes of the timing data, the timing value will not be updated. Alternatively, if the timing value differs from the timing data by more than two minutes, the timing value will be updated.

The aforementioned embodiments describe an electronic device that takes advantage of a date/time portion of a signal transmitted from a cordless base unit to a cordless handset during the receipt of an incoming telephone call. However, the invention is not limited to this scenario. Alternatively, the invention can include a cordless base unit that transmits a date/time signal unrelated to any telephone activity. For example, a cordless telephone base unit may transmit a date/time signal in response to a signal, such as an signal from an electronic device, a signal received from a central office, or a signal received from a user, such as by way of a user input unit, such as a keypad. Alternatively, a cordless base unit may transmit the date/time signal based on sensing a transition from a power-down condition, such as during a power failure, to a power-up condition.

Figure 7:
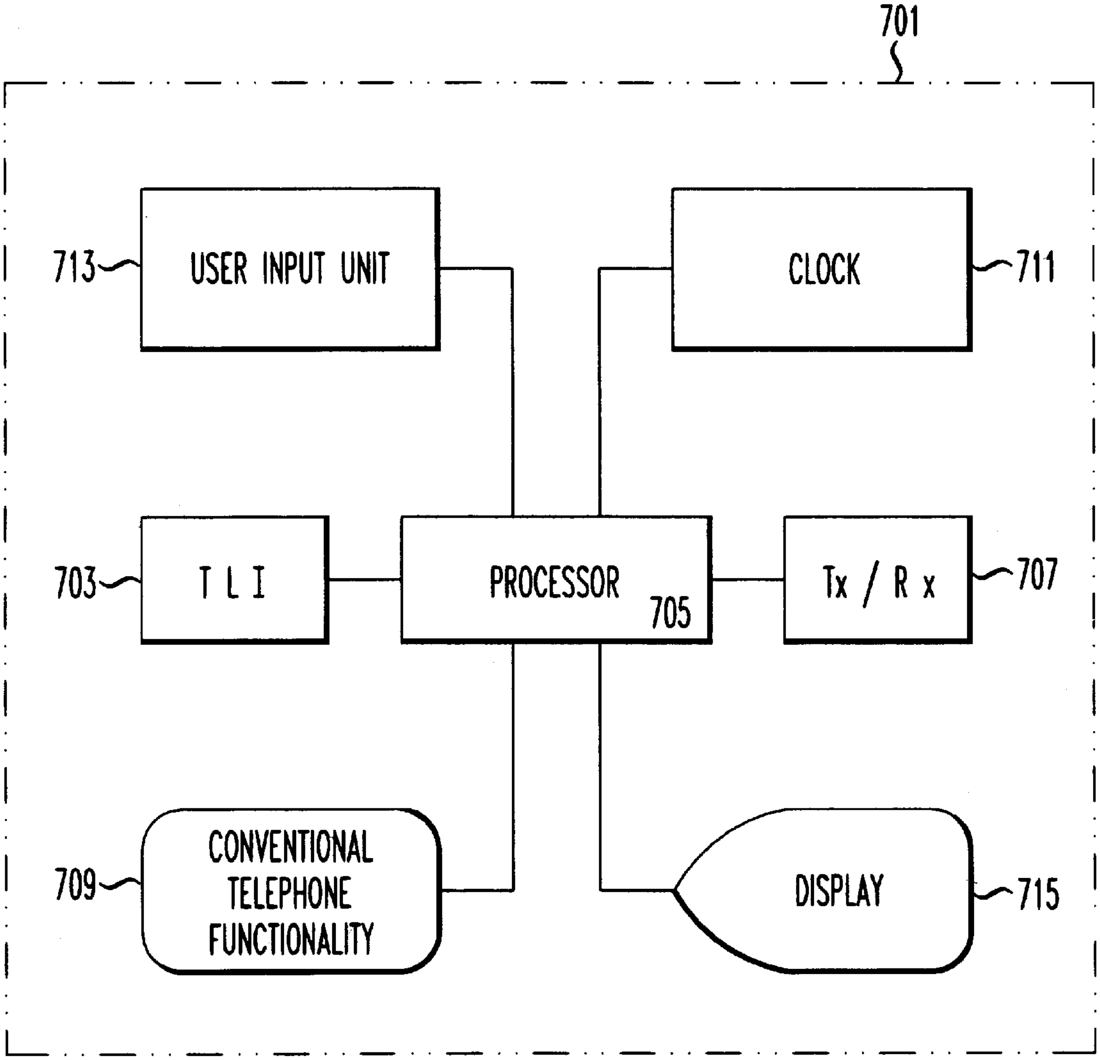
FIG. 7 is a simplified block diagram of a cordless telephone base unit according to one embodiment according to the invention.

FIG. 7 is a simplified block diagram of a cordless telephone base unit according to one embodiment according to the invention. Here, base unit 701 includes a conventional telephone line interface 703 for coupling to a network, such as a public switched telephone network. Processor 705 handles the conventional processes associated with sending and receiving telephone calls via the TLI, and may include appropriate filters and converters as are known to one of skill in the art.

Base unit 701 also includes transmit/receive unit 707 for use in transmitting to and receiving from a corresponding handset (or plurality of handsets, not shown). The transmissions to and from the handset are in a conventional form known to one of skill in the art, such as analog or digital, and at a conventionally used frequency. Base unit 701 also includes an other conventional telephone functionality block 709, and is capable of all conventional telephone functions known to one of skill in the art. Further, base unit 701 includes clock 711, and may optionally include user input unit 713 and display 715.

As is conventional, base unit 701 incorporates a date/time stamp into signals transmitted to a handset, and a device according to the invention utilizes this date/time stamp to update a base time as described earlier. This date/time stamp is conventionally incorporated into a ringing signal sequence when the handset is not coupled with base unit 701. Alternatively, according to the invention, the base unit 701 can transmit the date/time stamp at times other than when an incoming telephone call is being received, and/or at times when the handset is coupled with the base unit.

For example, according to one embodiment, processor 705 causes a date/time stamp to be transmitted via the transmit/receive unit 707 every time an incoming call is received, regardless of whether the handset is coupled with the base unit 701. This transmission may include just the date/time stamp, or may include all of the information, such as caller ID information, conventionally transmitted when the handset is not coupled with the base unit. Thus, according to this embodiment, a user's electronic clock may perform an update operation according to the invention whenever a telephone call is received.

According to another embodiment, processor 705 causes a date/time stamp to be output via the transmit/receive unit 707 in the absence of a received telephone call. For example, a date/time stamp can be output periodically, such as once per day, by processor 705 retrieving information from clock 711 and causing the output of the date/time stamp based on the retrieved information.

The information stored in clock 711 may itself be updated periodically, such as by the central office placing an updating call to the base unit 701 according to a regular service provided to specific customers. For example, a user may pay a monthly fee to a telephone service provider that provides telephone service via the PSTN, an internet, a wireless network, or any other type of network, and the service provider, as part of the service, will place a periodic update call that is recognized by the base unit 701 (so as not to be handled as a normal incoming telephone call) and is used by processor 705 to update information in clock 711.

According to yet another embodiment, processor 705 causes the date/time stamp to be output based on a trigger. For example, the telephone service provider may provide a signal to base unit 701 that informs processor 705 that a date/time stamp is to be output, and the processor may respond accordingly. Alternatively, a user may press a button on a keypad (one example of user input unit 713) to cause base unit 701 to output a date/time stamp. This may be advantageous, for example, upon the return of power after a power outage. When the user presses the button, all of the clocks in the household (or within range of base unit 701) can immediately synchronize to the correct time. For this purpose, processor 705 may cause display 715 to show the time of clock 711, and allow a user to alter this time via the user input unit 713. Thus, the user can set the correct time, and then press the button to cause the correct time to be output via the transmit/receive unit 707.

Sill further, a device other than a cordless telephone, such as a stand-alone device, can be configured according to the invention to transmit the date/time signal, based, for example, on user input or a sensed condition. For example, a clock synchronizing signal transmitting device may include as little as the processor 705, clock 711, and transmit/receive module 707 of cordless telephone base unit

701. Such a device may further include, for example, an AC power element as well as a DC battery backup element. Processor 705 can be programmed; for example, to transmit the date/time signal when the AC power recommences after a period of interruption.

The invention thus provides an apparatus and method for automatically updating a clock setting. Based on an understanding of the embodiments described herein, one of ordinary skill in the art may readily conceive of obvious variations to the disclosed embodiments, which, of course, fall within the scope of the invention. The invention should thus be interpreted broadly and limited solely by the following claims.

What is claimed is:

1. A clock, comprising:

a display;

a processor coupled to the display; and a wireless telephone receiving module coupled to the processor, wherein the wireless telephone receiving module is adapted to receive cordless telephone calls and to extract temporal information therefrom, and wherein the processor is adapted to receive the temporal information from the wireless telephone receiving module and to update the display based thereon.

2. A clock as recited in claim 1, wherein the display comprises a plurality of seven-segment display elements.

3. A clock as recited in claim 1, wherein the temporal information includes a time of day field, and wherein the processor compares timing data included in the time of day field to a currently displayed time.

4. A clock as recited in claim 3, wherein the processor takes an action based on a difference between the timing data included in the time of day field and the currently displayed time.

5. A clock as recited in claim 4, wherein the processor updates the display to reflect the timing data included in the time of day field based on the difference between the timing data included in the time of day field and the currently displayed time.

6. A clock as recited in claim 4, wherein the processor updates the display to reflect the timing data included in the time of day field if the timing data included in the time of day field differs from the currently displayed time by more than a threshold.

7. A clock as recited in claim 4, wherein the processor causes a signal to be transmitted, the signal reflecting the difference between the timing data included in the time of day field and the currently displayed time.

8. A clock as recited in claim 7, wherein the processor further awaits a response to the signal, and takes an action based on the response.

9. A clock as recited in claim 8, wherein the signal informs a user of at least one of the timing data included in the time of day field, the currently displayed time, and the difference between the timing data included in the time of day field and the currently displayed time, and wherein the processor updates the display based on the response.

10. A device, comprising:

a timing maintenance element;

a processor coupled to the timing maintenance element; and a wireless receiving module coupled to the processor, wherein the wireless receiving module is adapted to receive cordless telephone signals and to extract temporal information therefrom, and wherein the processor is adapted to receive the temporal information from the wireless receiving module and to update the timing maintenance element based thereon.

11. A device as recited in claim 10, wherein the temporal information includes a time of day field, and wherein the processor compares timing data included in the time of day field to a currently stored time in the timing maintenance element.

12. A device as recited in claim 10, wherein the processor takes an action based on a difference between the timing data included in the time of day field and the currently stored time in the timing maintenance element.

13. A device as recited in claim 12, wherein the processor updates the currently stored time in the timing maintenance element to reflect the timing data included in the time of day field based on the difference between the timing data included in the time of day field and the currently stored time.

14. A device as recited in claim 12, wherein the processor updates the currently stored time to reflect the timing data included in the time of day field if the timing data included in the time of day field differs from the currently stored time by more than a threshold.

15. A device as recited in claim 12, wherein the processor causes a signal to be transmitted, the signal reflecting the difference between the timing data included in the time of day field and the currently stored time.

16. A device as recited in claim 15, wherein the processor further awaits a response to the signal, and takes an action based on the response.

17. A device, comprising:

means for maintaining a time reference;

means, coupled to the time maintenance means, for controlling the time maintenance means; and receiving means, coupled to the controlling means, for receiving cordless telephone communication signals and extracting temporal information therefrom, wherein the controlling means is adapted to receive the temporal information from the receiving means and to update the time reference maintenance means based thereon.

18. A device as recited in claim 17, wherein the temporal information includes a time of day field, and wherein the controlling means compares timing data included in the time of day field to a currently stored time in the time reference maintenance means.

19. A device as recited in claim 17, wherein the controlling means takes an action based on a difference between the timing data included in the time of day field and the currently stored time reference in the time reference maintenance means.

20. A device as recited in claim 19, wherein the controlling means updates the currently stored time in the timing reference maintenance means to reflect the timing data included in the time of day field based on the difference between the timing data included in the time of day field and the currently stored time.

21. A device as recited in claim 19, wherein the controlling means updates the currently stored time reference to reflect the timing data included in the time of day field if the timing data included in the time of day field differs from the currently stored time reference by more than a threshold.

22. A device as recited in claim 19, wherein the controlling means causes a signal to be transmitted, the signal reflecting the difference between the timing data included in the time of day field and the currently stored time reference.

23. A device as recited in claim 22, wherein the controlling means further awaits a response to the signal, and takes an action based on the response.

* * * * *